United States Patent
Haugen et al.

(10) Patent No.: US 9,325,272 B2
(45) Date of Patent: Apr. 26, 2016

(54) HOT STANDBY POWER SUPPLY FOR A VARIABLE FREQUENCY DRIVE

(71) Applicants: Joern Tore Haugen, Oslo (NO); Haavar Forsell Ohma, Oslo (NO)

(72) Inventors: Joern Tore Haugen, Oslo (NO); Haavar Forsell Ohma, Oslo (NO)

(73) Assignee: Siemens Aktiengesellschaft, München (DE)

( * ) Notice: Subject to any disclaimer, the term of this patent is extended or adjusted under 35 U.S.C. 154(b) by 176 days.

(21) Appl. No.: 14/153,030

(22) Filed: Jan. 11, 2014

(65) Prior Publication Data

US 2014/0197768 A1    Jul. 17, 2014

(30) Foreign Application Priority Data

Jan. 11, 2013   (EP) ................................. 13151048

(51) Int. Cl.
*H02P 1/00* (2006.01)
*H02P 27/04* (2016.01)
*H02J 4/00* (2006.01)
*H02J 7/34* (2006.01)
(Continued)

(52) U.S. Cl.
CPC . *H02P 27/04* (2013.01); *H02J 4/00* (2013.01); *H02J 7/34* (2013.01); *H02J 9/04* (2013.01); *H02M 2001/0032* (2013.01); *Y02B 70/16* (2013.01)

(58) Field of Classification Search
CPC ............... B63H 23/00; H02J 3/36; H02J 5/00
USPC .......... 290/40 F, 8, 9, 30 B; 440/6, 84–87; 701/21, 22, 19, 33.7, 36; 318/442, 441, 318/440, 139; 320/134, 104, 137; 903/903, 903/907, 902
See application file for complete search history.

(56) References Cited

U.S. PATENT DOCUMENTS

| 4,956,563 | A | * | 9/1990 | Schornack | ............... | H02J 9/062 307/66 |
| 5,055,703 | A | * | 10/1991 | Schornack | ............... | H02J 9/062 307/64 |

(Continued)

FOREIGN PATENT DOCUMENTS

| EP | 2482425 | 8/2012 |
| EP | 2503666 | 9/2012 |
| KR | 100684599 | 2/2007 |

OTHER PUBLICATIONS

European Search Report in European Patent Application No. EP 13 15 1048, dated Aug. 6, 2013, 5 pages.
(Continued)

*Primary Examiner* — Rita Leykin
(74) *Attorney, Agent, or Firm* — Lempia Summerfield Katz LLC

(57) ABSTRACT

A hot standby power supply for a variable frequency drive of a floating vessel is provided. The variable frequency drive may power an electric motor of the floating vessel. The hot standby power supply includes a power input for receiving electric power from a main power supply of the floating vessel. The hot standby power supply also includes a first electric connection configured to supply electric power at a first voltage level to a converter power input of the variable frequency drive, and a second electric connection configured to supply electric power at a second voltage level to control power input of the variable frequency drive. The first voltage level is higher than the second voltage level. A transformer is further provided for transforming received electric power to the first voltage level or to the second voltage level.

16 Claims, 7 Drawing Sheets

(51) Int. Cl.
*H02J 9/04* (2006.01)
*H02M 1/00* (2006.01)

(56) References Cited

U.S. PATENT DOCUMENTS

| | | | |
|---|---|---|---|
| 5,315,533 A * | 5/1994 | Stich | H02J 9/062 307/66 |
| 6,188,139 B1 * | 2/2001 | Thaxton | B63H 23/24 290/4 A |
| 6,435,294 B1 * | 8/2002 | Hara | B60K 6/48 180/65.25 |
| 6,856,040 B2 * | 2/2005 | Feddersen et al. | 290/44 |
| 7,701,082 B2 * | 4/2010 | Lazarovich | H02J 5/00 244/58 |
| 8,253,273 B2 * | 8/2012 | Fredette et al. | 307/64 |
| 8,680,707 B2 * | 3/2014 | Childs et al. | 307/9.1 |
| 8,970,176 B2 * | 3/2015 | Ballatine et al. | 320/138 |
| 2007/0077830 A1 | 4/2007 | Rzadki et al. | |

OTHER PUBLICATIONS

International Maritime Organization, "Guidelines for Vessels with Dynamic Positioning System", Jun. 6, 1994, 17 pages.

* cited by examiner

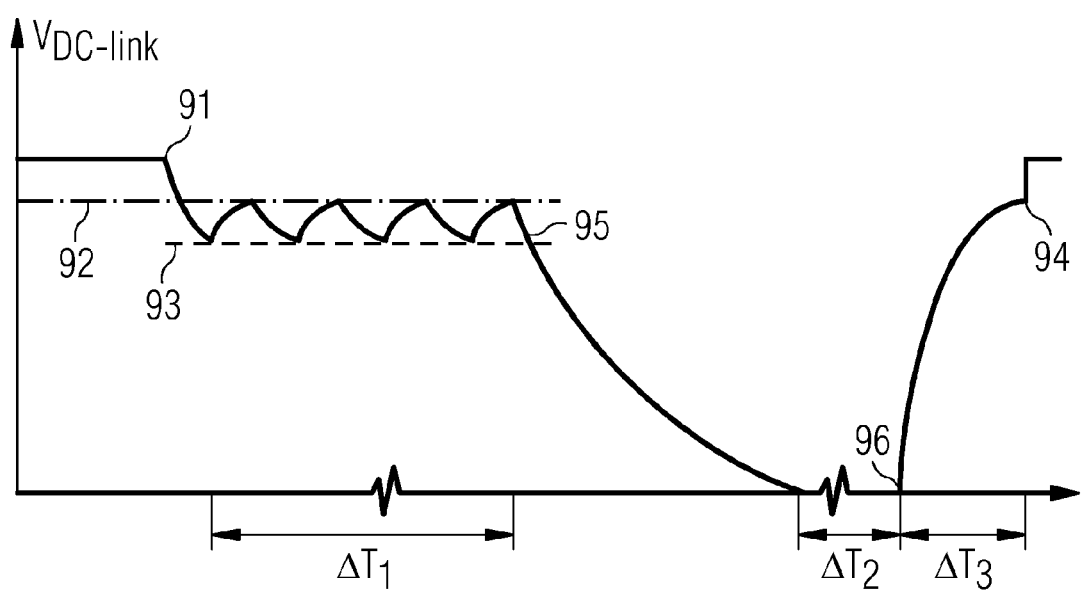

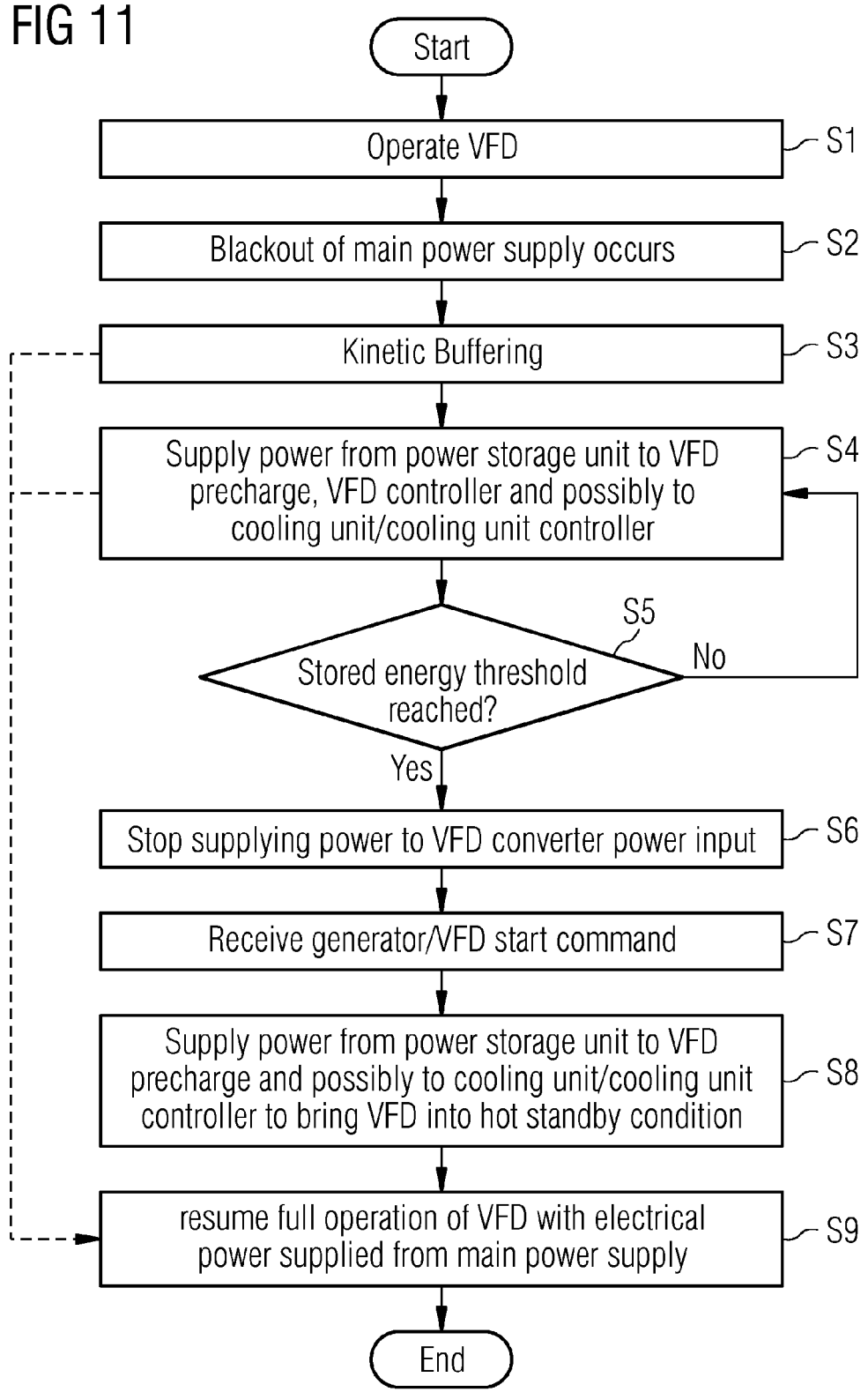

HOT STANDBY POWER SUPPLY FOR A VARIABLE FREQUENCY DRIVE

This application claims the benefit of EP 13151048, filed on Jan. 11, 2013, which is hereby incorporated by reference in its entirety.

FIELD

The present embodiments relate to a hot standby power supply for a variable frequency drive of a floating vessel, a corresponding drive system including such a hot standby power supply, and a method of operating a hot standby power supply.

BACKGROUND

Some types of floating vessels, such as drill ships, floating platforms, drilling semi-submersibles, floating production storage and off-loading vessels (FPSOs) and the like use electric propulsion systems in which propellers are driven by electrical motors. Examples include azimuth thrusters of a vessel, which include an electric motor arranged in a pot. The electric motor is directly connected to the propeller. Electricity may be produced on board of such vessels, for example, by one or more generators coupled to a diesel engine or gas turbine, and transmitted by an onboard power grid to the electric motor for driving the thruster. Such vessel may include further electric drives that require electrical energy for operation, including anchor winch drives, drives of drilling applications, drives of drawworks, and the like. Such vessels may also include electric motors operating auxiliaries.

Marine vessels employing such types of electric drives may include an onboard power plant that produces the required electrical energy, for example, by the above mentioned diesel engine or gas turbine coupled to a generator. Such arrangements provide the main power supply for the vessel. If the power plant experiences a blackout, or if there is a fault in the onboard power grid or in a component coupled thereto, the vessel will lose its main power supply.

The electric motors (e.g., of the thrusters) may be driven by a variable frequency drive for enabling speed control. If a blackout of the main power supply occurs, these frequency converters map trip on under-voltage and may be out of service for the duration of the blackout. After the onboard power plant resumes operation, the variable frequency drives require a certain startup time to come back online and to start supplying electric power to the electric motors. Restarting the variable frequency drive may also include the starting of all auxiliary devices, such as cooling pumps, fans, lubrication pumps and so on. The duration for restarting a variable frequency drive may be significant.

Although the power plants of such vessels may be designed to restore electric power as fast as possible, and the electric drives are designed to restart as fast as possible, there may be a significant delay before the electric drives may continue to operate. Long delays are undesirable, for example, for marine vessels having electric propulsion systems, as inoperability of the thruster drives may lead to a loss of position and maneuverability. Vessels operating dynamic positioning systems of higher classifications, such as equipment class 2 (DP2, e.g., DYNPOS-AUTR) or equipment class 3 (DP3, e.g., DYNPOS-AUTRO) and the like (see IMO MSC/Circ.645, "Guidelines for vessels with dynamic positioning systems"), thus have a certain redundancy in the power generation systems. The power generation system may, for example, be split into several separate and independent subsystems. For DYNPOS-AUTRO classification or DPS3-classification, the main bus bar is, for example, split into two or more different sections, each being connected to a generator. Bus tie breakers provided between the sections of the main power distribution bus may be open during class 3 operation so that one section is not affected by a blackout in another section.

This effort may be made since the time that the thrusters require for coming back online after a blackout is too long. One of the reasons for this is the startup time required for the frequency converters. Operating the vessel with split sections of the power system makes operation rather ineffective and leads to a higher fuel consumption and thus increased operating costs.

SUMMARY AND DESCRIPTION

The scope of the present invention is defined solely by the appended claims and is not affected to any degree by the statements within this summary.

It is desirable to operate with closed bus tie breakers even in equipment class 3 (DP3) operation. In such a system with split sections of the power distribution bus and the power grid, it is desirable to bring the frequency converters back online as fast as possible after a blackout in a power grid section in order to resume safe operation of the vessel.

There is a need for mitigating at least some of the drawbacks mentioned above and for making the time during which a variable frequency drive is unavailable after a blackout as short as possible (e.g., to improve recovery times of an electrical drive after a blackout of the vessel's power system). The present embodiments may obviate one or more of the drawbacks or limitations in the related art. For example, the need described above may be met by the present embodiments.

An embodiment provides a hot standby power supply for a variable frequency drive of a floating vessel. The variable frequency drive powers an electric motor of the floating vessel (e.g., an electric motor of a thruster). The floating vessel may, for example, be a dynamically positioned vessel. The hot standby power supply includes a power input for receiving electric power from a main power supply of the floating vessel, a first electric connection configured to supply electric power at a first voltage level to a converter power input of the variable frequency drive, a second electric connection configured to supply electric power at a second voltage level to a control power input of the variable frequency drive. The first voltage level is higher than the second voltage level. The hot standby power supply also includes a transformer for transforming received electric power to the first voltage level or to the second voltage level. The hot standby power supply further includes an electric power storage unit for storing and supplying electric power. The electric power storage unit is electrically connected so as to be capable of supplying electric power to both the first electric connection and the second electric connection. One connection of the first electric connection and the second electric connection is supplied from the electric power storage unit via the transformer for providing the first voltage level or the second voltage level, respectively. The hot standby power supply further includes a control unit adapted to control the hot standby power supply such that in operation, electric power received at the power input is provided to the converter power input and to the control power input of the variable frequency drive via the first and second electric connections. The control unit is further adapted to control the hot standby power supply such that upon an interruption in the supply with electric power from the main power supply, electric power is supplied from the electric power storage unit to the converter power input and to the control power input of the variable frequency drive via the first and second electric connections.

The hot standby power supply thus provides a power supply for the variable frequency drive (VFD), which uses only one power input from the main power supply, and may provide the appropriate electric power to both the converter and the controller of the variable frequency drive. Further, if the power supply to the hot standby power supply fails (e.g., due to a blackout of the main power supply), the hot standby power supply (HSPS) continues to provide electric power to both converter and controller, whereby a continued availability of the variable frequency drive may be provided. This allows the VFD to remain in a standby state, which provides a rapid restart of the VFD upon restoring the main power supply.

In an embodiment, the transformer may be a step-down transformer configured to provide a voltage conversion from the first voltage level to the second voltage level. In such configuration, the transformer may accordingly be provided with the voltage at the first voltage level, which is also provided to the first electric connection for the converter power input, and may transform this voltage to the second voltage level, which is provided to the second electric connection for the control power input of the VFD. In another configuration, the transformer may be a step-up transformer that provides a voltage conversion from the second voltage level to the higher first voltage level. The configuration may be chosen in accordance with the voltage level received at the power input of the HSPS.

The first voltage level may, for example, lie within a range of about 300 V to about 1,000 V (e.g., may lie within the range between about 350 V and about 700 V). Examples are 400 V or 690 V. The second voltage level may lie in the range between about 100 V and about 700 V (e.g., between about 100 V and about 400 V). Particular examples for the second voltage level include 110 V, 230 V, 240 V, or 400 V.

In an embodiment, the HSPS may further include a second transformer connected to the power input of the HSPS. The second transformer is configured to convert electric power received at the power input from a receiving voltage level to the first or second voltage level. As an example, the receiving voltage level at which the electric power is received at the power input may be about 690 V. The voltage is converted by the second transformer to a level of about 400 V, and by the first transformer, to a level of about 230 V. The electric power storage unit may be electrically coupled to a secondary side of the second transformer. Electric power supplied by the electric power storage unit may thus not need to be converted again by the second transformer.

The electric power may accordingly be received from the main power supply at a voltage level that is different to the first and second voltage levels.

In an embodiment, the HSPS may further include a third electric connection to an auxiliaries power input of the variable frequency drive. The auxiliaries power input may be electrically coupled to one or more auxiliaries of the variable frequency drive including at least a cooling unit. The hot standby power supply may be configured to supply electric power at the first or at the second voltage level to the auxiliaries power input via the third electric connection so as to provide electric power to the cooling unit of the VFD. Accordingly, if components of the VFD are to be cooled (e.g., of a converter included in the VFD), a corresponding cooling unit providing such cooling may be operated even after a blackout of the main power supply. Even such VFD may thus remain in standby mode during the blackout and may restart immediately after the return of the main power supply. In one embodiment, the HSPS is configured to provide electric power at the first voltage level to the auxiliaries power input of the VFD.

In an embodiment, the electric power received from the main power supply is AC electric power, and the electric power storage unit includes a DC electric power storage element and a converter. The converter may be configured to convert received AC electric power to DC electric power for charging the storage element of the power storage unit, and to convert DC electric power supplied by the storage element to AC electric power when the electric power storage unit supplies electric power to the first and second electric connections (e.g., during a blackout of the main power supply when the VFD is fed from the electric power storage unit).

The DC electric power storage element (e.g., a storage element) may, for example, be a battery, a capacitor bank, or a combination thereof. The converter of the power storage unit may be an inverter/rectifier that, in one operating mode, acts as a rectifier for charging the power storage element, and, in another operating mode, acts as an inverter when drawling electric power from the storage element. In other embodiments, the converter may be a full converter (e.g., including rectifier and inverter) with an intermediate DC link to which the electric power storage element is coupled, and through which the electric power received at the power input flows during normal operation of the HSPS.

In an embodiment, the HSPS further includes a communication link towards a controller of the variable frequency drive. The communication link is configured to enable a communication between the controller of the HSPS and the controller of the VFD. Using such communication link, it may be provided, for example, that upon interruption of the main power supply, the VFD stops to actively drive the associated electric motor but remains in a standby state with minimum power consumption. The restart of the VFD may be controlled after the main power supply comes back online. The controller of the HSPS may be configured to exchange respective information and instructions to achieve these functions. In other embodiments, only a single controller may be provided for controlling both the HSPS and the VFD, making such communication link omissible.

As an example, the controller of the HSPS may be configured to start supplying electric power from the electric power storage unit to the VFD upon receiving an indication of a voltage drop on a DC link of a converter of the VFD below a voltage threshold via the communication link. As an example, the controller of the VFD may communicate the voltage level on the DC link of the converter to the controller of the HSPS, or the controller may communicate an error message, a trigger message, or the like. The controller of the HSPS may also be configured to start supplying electric power from the electric power storage unit upon determining an interruption of the main power supply (e.g., by detecting a voltage level on the power input, or by receiving a corresponding indication such as a message from the vessels power network or power grid). In other embodiments, the electric power storage unit may start supplying electric power automatically without controller interaction (e.g., when the electric power storage unit includes a converter having an intermediate DC link to which a power storage element is coupled (as described above)), and the voltage on the intermediate DC link drops due to an interruption in the main power supply.

The controller of the HSPS may send a corresponding message via the communication link to the controller of the VFD to stop supplying electric power to the motor connected to the VFD. In consequence, electric power supplied by the HSPS on the first electric connection to the VFD may be used to maintain the voltage level on a DC link of a converter of the VFD above a threshold voltage in order to enable a fast restart of the VFD.

In an embodiment, the controller of the HSPS may be configured to terminate the supply of electric power from the electric power storage unit to at least one power input of the converter power input and the control power input of the VFD after a first amount of time or after a predetermined condition is met. The first amount of time may, for example, be a preset fixed period of time, which may be determined by the type of VFD supplied by the HSPS and the storage capacity of the electric power storage unit. The predetermined condition may be dynamically determined by a certain event (e.g., by the charging level of the power storage unit dropping below a certain threshold such as below a charging level of about 25%, 20%, 15%, 10% or the like). This may again depend on the type and capacity of the storage element used in the electric power storage unit, and on the power drawn by the VFD during the hot standby operation in which the electric power storage unit supplies power to the VFD. Other possibilities of determining the amount of time or a condition after which the supply of electric power from the storage unit is stopped may also be provided. For example, the supply with electric power may be stopped latest at a point in time at which the amount of electric energy stored in the electric power storage unit is still large enough to enable a restart of the VFD from the stored electric power (may be stopped earlier). In other embodiments, the controller may be configured such that the power supply is stopped only when the power stored in the power storage unit has run out.

In another embodiment, the controller performing the above described functions may not be included in the HSPS, but may be arranged in the VFD. For example, the controller may be the VFD controller that may be configured to provide the described functionality.

The controller may be configured to restart supplying electric power from the power storage unit to at least the converter power input of the variable frequency drive upon receiving an indication that the supply with electric power from the main power supply will resume (e.g., upon receiving an indication on a start signal being supplied to a generator of the main power supply). The HSPS may thus already restart the VFD in parallel to the main power supply coming back online. The HSPS may thus supply electric power to the converter power input for pre-charging a capacitance of a DC link of the converter of the VFD, so that operation of the VFD may resume immediately after power is again received at the power input from the main power supply. The additional restart time of the VFD in conventional systems, which may be significant, may thus be avoided. The start command that is sent by the power network to the generators is a good indication that the main power supply will soon come back online.

In an embodiment, the HSPS may also include an auxiliaries power input for receiving auxiliaries power from the main power supply, and may also include a further electric connection to a non-essential auxiliaries input of the VFD. The HSPS is configured to provide power received at the auxiliaries power input via the further electric connection to the non-essential auxiliaries input of the VFD.

The HSPS may also include a communication input for receiving a shutdown signal, and may be configured to disconnect at least an energy storage element of the electric power storage unit upon receiving a shutdown command via the interface. The HSPS may be configured to shutdown the HSPS upon receiving such command.

The HSPS may include further electric connections for providing electric power at the second voltage level to further consumers (e.g., for providing electric power to controllers of further devices, such as a controller of a VFD transformer, a controller of a motor connected to the VFD or the like). For this purpose, the HSPS may include additional connection terminals for providing such electric connections. Internally, these terminals of the HSPS may be connected in parallel to the second electrical connection. Other configurations may be provided (e.g., branching of the further electric connection from the second electric connection external to the HSPS).

According to a further embodiment, a drive system that includes a variable frequency drive for powering an electric motor of a floating vessel (e.g., an electric motor of a thruster of the floating vessel) is provided. The variable frequency drive includes a converter having a DC link, a controller for controlling the variable frequency drive, a converter power input for supplying electric power to the converter and to the DC link, and a controller power input for supplying electric power to the controller of the variable frequency drive. The drive system further includes a hot standby power supply according to any of the above outlined configurations. The first electric connection of the hot standby power supply is electrically connected to the converter power input, and the second electric connection of the hot standby power supply is electrically connected to the controller power input. A compact and easy to connect drive system that may maintain the variable frequency drive in a standby state over a certain period of time in the event of an interruption of the main power supply may thus be achieved. There is no switching over between different types of power supplies required in case of interruption of the main power supply. With only a single power connection to the hot standby power supply, the converter (e.g., a DC link of the converter) and the controller of the variable frequency drive may be provided with electric power.

In an embodiment, the drive system is a drive system of a dynamically positioned vessel, and the variable frequency drive is configured to supply electric power to an electric motor of a thruster of the dynamically positioned vessel. This allows a fast restart of the thruster after a blackout of the power supply of the dynamically positioned vessel, thereby providing secure positioning of the vessel. Providing a hot standby for the variable frequency drive may enable an operation of the power system of such dynamically positioned vessel in an Equipment class 3 (DP3) mode with closed bus tie breakers between sections of the power system (e.g., a power distribution bus), since the time required to restart the thrusters of the dynamically positioned vessel after a blackout of the power system may be reduced significantly.

In an embodiment, the variable frequency drive further includes a charging transformer connected between the converter power input and the converter. The charging transformer may thus supply a voltage suitable for charging the capacitance in the DC link of the converter. In other embodiments, such charging transformer may not be provided, or may be provided in a different unit (e.g., in the HSPS).

In a further embodiment, the variable frequency drive includes a cooling unit (e.g., for cooling a component of the converter). The drive system includes an electric connection between the hot standby power supply and the variable frequency drive enabling the supply of electric power from the electric power storage unit to the cooling unit. This electric connection may be an additional third electric connection or may be the first electric connection or the second electric connection via which power is transmitted to the cooling unit. Keeping the converter of the VFD operable after a blackout of the main power supply or restarting the converter may require operation of the cooling unit, which may include a cooling pump and/or a cooling unit controller. The power for operating these in case of a blackout may be provided via the electric connection by the HSPS (e.g., by the electric energy storage unit of the HSPS). Depending on the configuration, the electric power provided via the electric connection may be at a first or second voltage level, or may be at a third voltage level derived from the first or second voltage levels. In normal operation, the cooling unit may receive electric power via the HSPS and the power input of the HSPS and via the electric connection.

In an embodiment, the VFD may further include a cooling unit controller, and the drive system may be configured to be capable of supplying electric power from the HSPS to both the VFD controller and the cooling unit controller at the second voltage level. The controller of the cooling system of the VFD may, for example, be supplied with electric power via the second electric connection.

In an embodiment, the VFD includes a cooling unit for cooling the VFD in operation, and a cooling unit controller. The controller of the HSPS is configured to stop operation of the cooling unit upon the HSPS providing electric power from a power storage unit of the HSPS to the VFD via the first and second electric connections. This may, for example, be achieved by sending corresponding instructions via the above mentioned communication link. The usage of electric energy by the VFD in the standby mode may thus be reduced.

In some embodiments, the controller of the HSPS may be arranged within the same physical unit that houses the main components of the HSPS. In other embodiments, the HSPS controller may be arranged in another unit (e.g., within a VFD to which the HSPS is connected). In some embodiments, the controller of the HSPS may be the same as the controller of the VFD, or may be part of the controller of the VFD. A single controller may thus be provided for controlling the VFD and the HSPS, and such controller may be located in either unit or at another location (e.g., in a control room or the like).

In an embodiment, the drive system further includes a variable frequency drive cabinet. The variable frequency drive is mounted in the variable frequency drive cabinet. The drive system further includes a hot standby power supply cabinet. The hot standby power supply is mounted in the hot standby power supply cabinet. The hot standby power supply cabinet is mounted adjacent to the variable frequency drive cabinet. A compact drive system that has a small foot print and is easy to connect may thus be achieved for powering an electric motor of a floating vessel (e.g., the motor of a thruster). The VFD cabinet and the HSPS cabinet may be mounted on a common frame.

In an embodiment, the drive system may also be configured to provide kinetic buffering upon interruption of the main power supply. The VFD may, for example, be configured to receive electric power generated by the electric motor coupled to the VFD, to convert the received electric power and to provide the converted electric power to the DC link of the converter so as to maintain the voltage on the DC link above a predetermined voltage level. The duration during which the VFD may be operated in a standby mode may thus be increased.

In a further embodiment, the controller of the HSPS may be configured to start supplying electric energy from the electric power storage unit to the VFD after the interruption of the main power supply and after the supply of electric power to the VFD by kinetic buffering has dropped below a predetermined level or has ceased. The time for a standby operation of the VFD may thus be prolonged. Again, in other embodiments, the controller of the VFD may be configured so as to provide this functionality.

The converter power input is, in an embodiment, not the main operating power input of the VFD via which electric power is supplied to the VFD for operating the electric motor connected thereto. Rather, the converter power input of the VFD is coupled to a DC-link of a converter of the VFD for pre-charging the DC-link. It may, in such embodiment, also be termed converter precharge power input. The HSPS may thus constitute a power supply that supplies auxiliary power to the VFD, but not the main operating power.

In another embodiment, a method of operating a hot standby power supply for supplying electric power to a variable frequency drive is provided. The method includes receiving electric power at a power input of a hot standby power supply from a main power supply, and providing electric power at a first voltage level to a converter power input of the variable frequency drive via a first electric connection. The method also includes providing electric power at a second voltage level to a controller power input of the variable frequency drive via a second electric connection. The first voltage level is higher than the second voltage level. The method also includes transforming the received electric power to the first voltage level or to the second voltage level using a transformer. The method includes the providing received electric power to a power storage unit for charging the power storage unit, detecting an interruption in the supply with electric power by the main power supply, and supplying electric power from the power storage unit to the converter power input and to the controller power input of the variable frequency drive via the first electric connection and the second electric connection. One electric connection of the first electric connection and the second electric connection is supplied with the electric power via the transformer for providing the respective first or second voltage level.

Using this method, advantages similar to the ones outlined further above with respect to embodiments of the hot standby power supply or the drive system may be achieved. In embodiments of the method, the method may include further acts including the acts described above with respect to the HSPS and the drive system. The method may be performed on the HSPS or the drive system in any of the above outlined configurations.

In an embodiment, the method may further include providing electric power to a converter (e.g., to a DC link of the converter) of the VFD using kinetic buffering before providing electric power to the VFD from the electric power storage unit. The method may further include providing electric power to the converter power input of the VFD until the voltage of a DC link of a converter coupled to the converter power input has reached a predetermined pre-charge voltage setpoint, and stopping the supply of the electric power to the converter power input after the voltage level on the DC link has reached the pre-charge voltage setpoint. The method may further include starting to provide electric power from the power storage unit to the converter power input of the VFD upon the voltage level on the DC link dropping to a predetermined voltage threshold. The method may further include stopping to supply electric power from the power storage unit to the VFD after a predetermined amount of time or when a predetermined condition is met (e.g., after the electric energy remaining in the power storage unit dropping to a predetermined level).

In an embodiment, the method may further include restarting to supply electric power from the power storage unit to the converter power input of the VFD upon receiving an indication that the supply with electric power from the main power supply will resume (e.g., receiving an indication on a start signal being supplied to a generator of the main power supply). This way, the VFD may be brought into a state in which the VFD is ready for operation in parallel to the main power supply being brought back online.

The features of the embodiments mentioned above and those yet to be explained below may be combined with each other unless noted to the contrary.

BRIEF DESCRIPTION OF THE DRAWINGS

In the drawings, like reference numerals refer to like elements.

FIG. 10 is a diagram showing voltage on a DC link of a converter after blackout of a main power supply when the converter is brought into an operating state in parallel to the starting up of the main power supply in accordance with an embodiment.

FIG. 11 is a flow diagram illustrating a method according to an embodiment.

DETAILED DESCRIPTION

Figure 1:
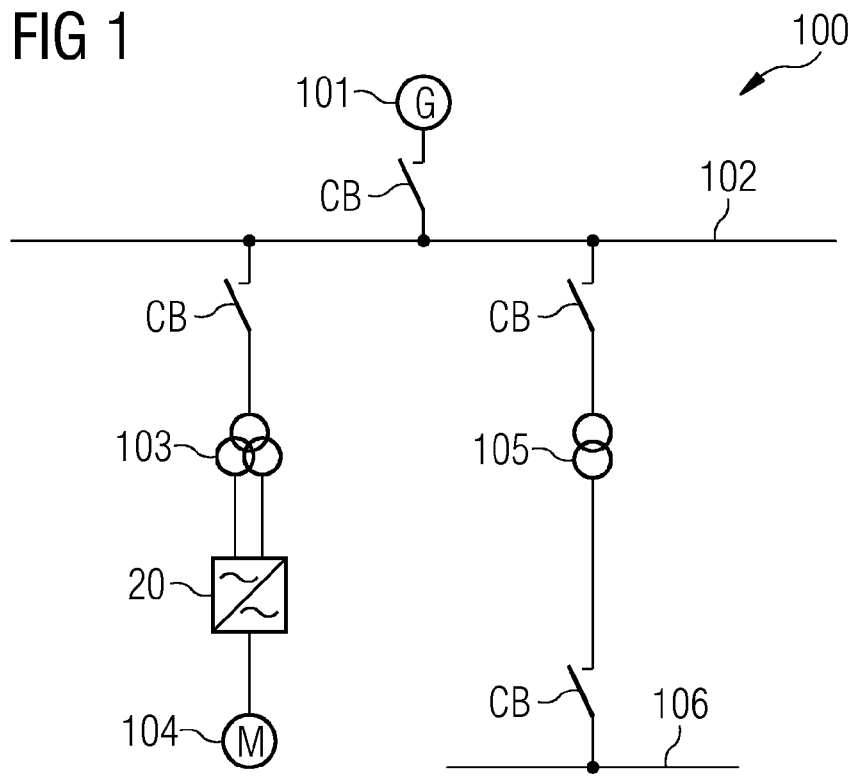
FIG. 1 is a schematic diagram showing a power system of a floating vessel according to an embodiment.

In the following, embodiments are described in detail with reference to the accompanying drawings. The following description of the embodiments is given only for the purpose of illustration and is not to be taken in a limiting sense.

The drawings are schematic representations only, and elements in the drawings are not necessarily to scale with each other. The representation of the various elements is chosen such that function and general purpose of the elements are apparent to a person skilled in the art. The coupling of physical or functional units as shown in the drawings and described hereinafter does not need to be a direct connection or coupling, but may also be an indirect connection or coupling (e.g., a connection or a coupling with one or more additional intervening elements). The skilled person will further appreciate that the physical or functional units illustrated and described herein with respect to the different embodiments do not need to be implemented as physically separate units. One or more physical or functional blocks or units may be implemented in a common circuit, chip, circuit element or unit, while other physical or functional blocks or units may be implemented in separate circuits, chips, circuit elements or units.

FIG. 1 shows a schematic diagram of one embodiment of a power grid of a floating vessel. The power grid may actually vary significantly in dependence on the purpose to be served. The power system 100 includes a generator 101 that may, for example, be coupled to a diesel engine or a gas turbine (e.g., several of such generators (four, six, eight or more) may be included in the power system). The generator 101 is connected to the high voltage switchgear 102 via a circuit breaker (CB). In another embodiment, the switchgear may be a medium voltage or low voltage switchgear. A plurality of such switchgears may be included in the power system 100. Via switchgear 102, electric power generated by generator 101 is distributed across the vessel. Power system 100 further includes an electric AC motor 104 that is a motor of a thruster of the vessel. The motor 104 may, for example, be included in a pod of an azimuth thruster, and the vessel may include a plurality of such motors (e.g., four, eight or more). For enabling control of the rotational speed of motor 104, the motor 104 receives electric power for operation from a variable frequency drive 20. A three winding transformer 103 provides electric power from the high voltage switchgear 102 to the variable frequency drive (VFD) 20. Other types of transformers may be used in other embodiments. Transformer 103, VFD 20 and motor 104 may be part of a variable frequency drive system (VFDS), or short drive system.

The components 103, 20 and 104 may operate at voltages in the high voltage range (e.g., in a range between about 1,000 and about 15,000 V). These elements may include components, such as controllers, cooling equipment and other auxiliaries, which are operated at a lower voltage range (e.g., between about 20 and about 1,000 V). For this purpose, a distribution transformer 105 that transforms the high voltage on the switchgear 102 into a lower voltage is provided. The lower voltage is then distributed via the low voltage distribution 106 (e.g., by a low voltage distribution panel including a distribution bus or the like). In a normal operation, power generated by the generator 101 is provided to the motor 104, which turns a propeller of the thruster of the vessel, and thus propels the vessel. If the vessel is a dynamically positioned vessel, the vessel includes a control system that allows the vessel to maintain a position within predefined limits. This a continuous operation of the thruster drives may be provided to counteract waves, currents, wind and the like. Especially during critical operations, such as drilling, position keeping is of importance, so that operability of the motor 104 is to be provided. If a blackout of the main power supply occurs, the motor 104 may be brought back into an operational state as fast as possible.

Figure 2:
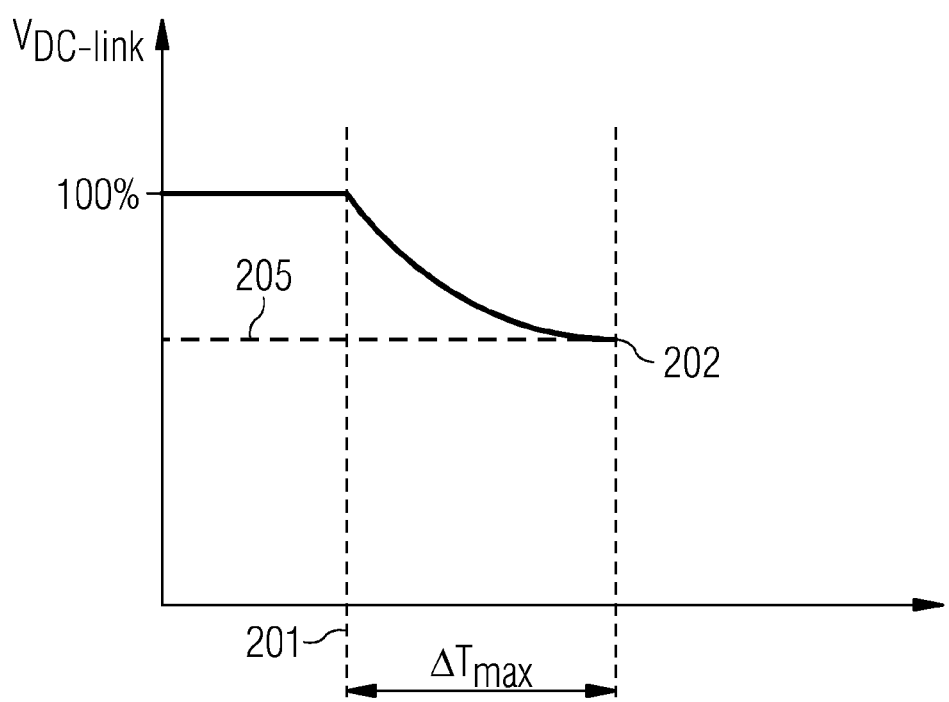
FIG. 2 is a diagram showing a drop in DC voltage on a DC link of a converter upon a blackout in a main power supply.

The VFD 20 may include a rectifier section for rectifying an AC voltage supplied by the three winding transformer 103, an intermediate DC link with a capacitance for removing distortions (e.g., harmonics), and an inverter stage for providing AC voltage at the desired frequency. The VFD 20 may include a pre-charge unit that allows the capacitor of the DC link to be pre-charged in order to avoid high inrush currents when starting up the VFD 20. In normal operation, the voltage on the DC link has a certain voltage level, which is depicted in FIG. 2. In normal operation, the voltage on the DC link ($V_{DC-link}$) is at 100%. After the occurrence of a blackout of the main power supply at time 201, the voltage on the DC link starts to drop. If the voltage drops to a certain level 205 (e.g., DC-link trip level), the VFD 20 will trip and thus cease operation, and the circuit breaker opens (see numeral 202). As mentioned above, after the VFD 20 has gone out of operation, a substantial amount of time will be required to restart the VFD. If the power from the main power supply returns before the DC link trip level 205 is reached, the VFD 20 may resume operation.

Figure 3:
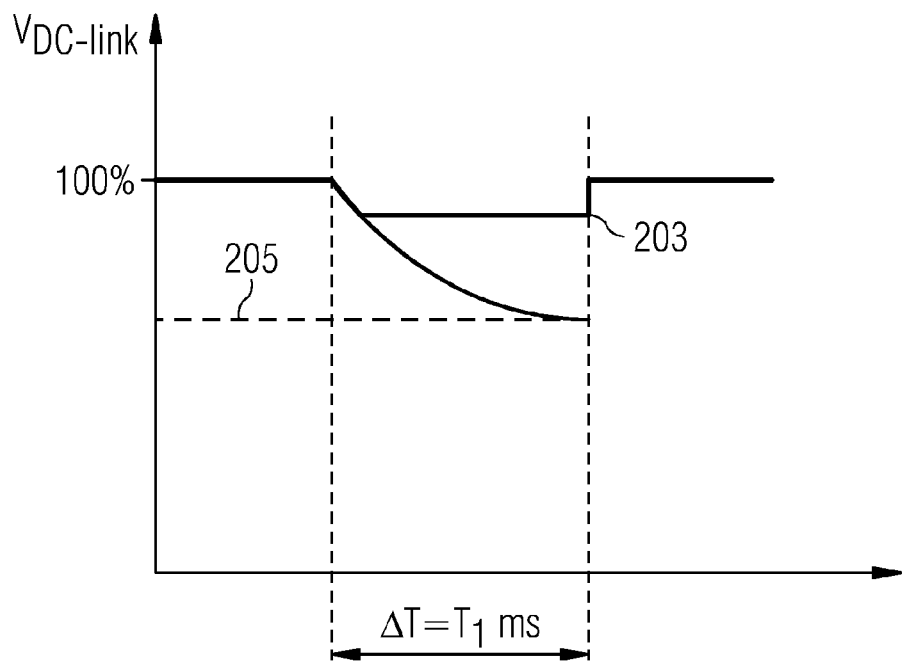
FIG. 3 is a diagram showing a voltage on a DC link of a converter after a blackout of the main power supply when kinetic buffering is available.

A situation in which kinetic buffering is available in the drive system is depicted in FIG. 3. Kinetic buffering is based on the fact that after the power supply to the motor 104 stops, the motor 104 will continue to turn due to the kinetic energy stored in the rotor connected to the motor. When the motor 104 is rotated by this stored kinetic energy, electric energy that is supplied to the VFD 20 is generated which. Accordingly, the voltage on the DC link may be maintained at a defined level by the electric power supplied by the motor 104. The time until which the voltage on the DC link reaches the DC link trip level 205 may thus be prolonged. If the main power supply is restored within this time, the VFD 20 may resume operation (see numeral 203).

Figure 4:
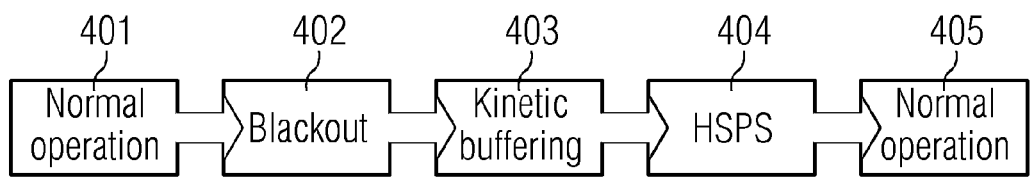
FIG. 4 is a flow diagram illustrating a method according to an embodiment.

Even if kinetic buffering is available, the time until the VFD trips may be rather short and often shorter than the time required to restore the main power supply. After the tripping of the VFD, a substantial amount of time may be required to bring the VFD back to an operating state after the main power supply was restored. One or more of the present embodiments thus provide a hot standby power supply that allows extending the time during which the VFD remains operational after a blackout of the main power supply, and further reduces the time the VFD is operational after the main power supply has been restored. FIG. 4 is a flow diagram showing one embodiment of a sequence of events upon a blackout of the feeding power grid. In the example of FIG. 4, kinetic buffering is available. After normal operation in act 401 and the blackout of the main power supply in act 402, kinetic buffering is activated in act 403. The kinetic buffering will maintain the voltage on the DC link of the converter of the VFD above the trip level as long as there is kinetic energy available in the drive system. When the kinetic energy has been consumed, the HSPS will take over in act 404 and will maintain the DC link voltage above the DC link trip level for as long as possible (e.g., until the energy storage in the HSPS is discharged to a certain level or completely depleted). The energy storage unit of the HSPS may be sized so that for most blackout situations, the main power supply may be restored before the DC link trip level is reached. After restoring the main power supply, the normal operation is resumed in act 405.

Figure 5:
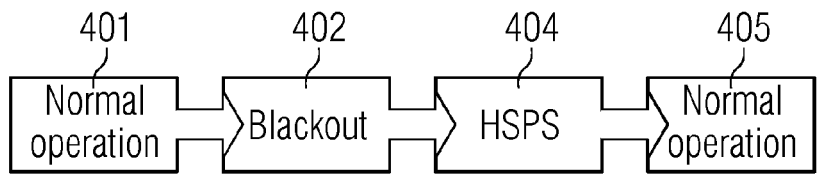
FIG. 5 is a flow diagram illustrating a method according to an embodiment.

FIG. 5 is a flow diagram showing a situation in which no kinetic buffering is available. Accordingly, the HSPS will maintain the DC link voltage immediately after the blackout occurs. The HSPS may thus also be used without the feature of kinetic buffering.

Figure 6:
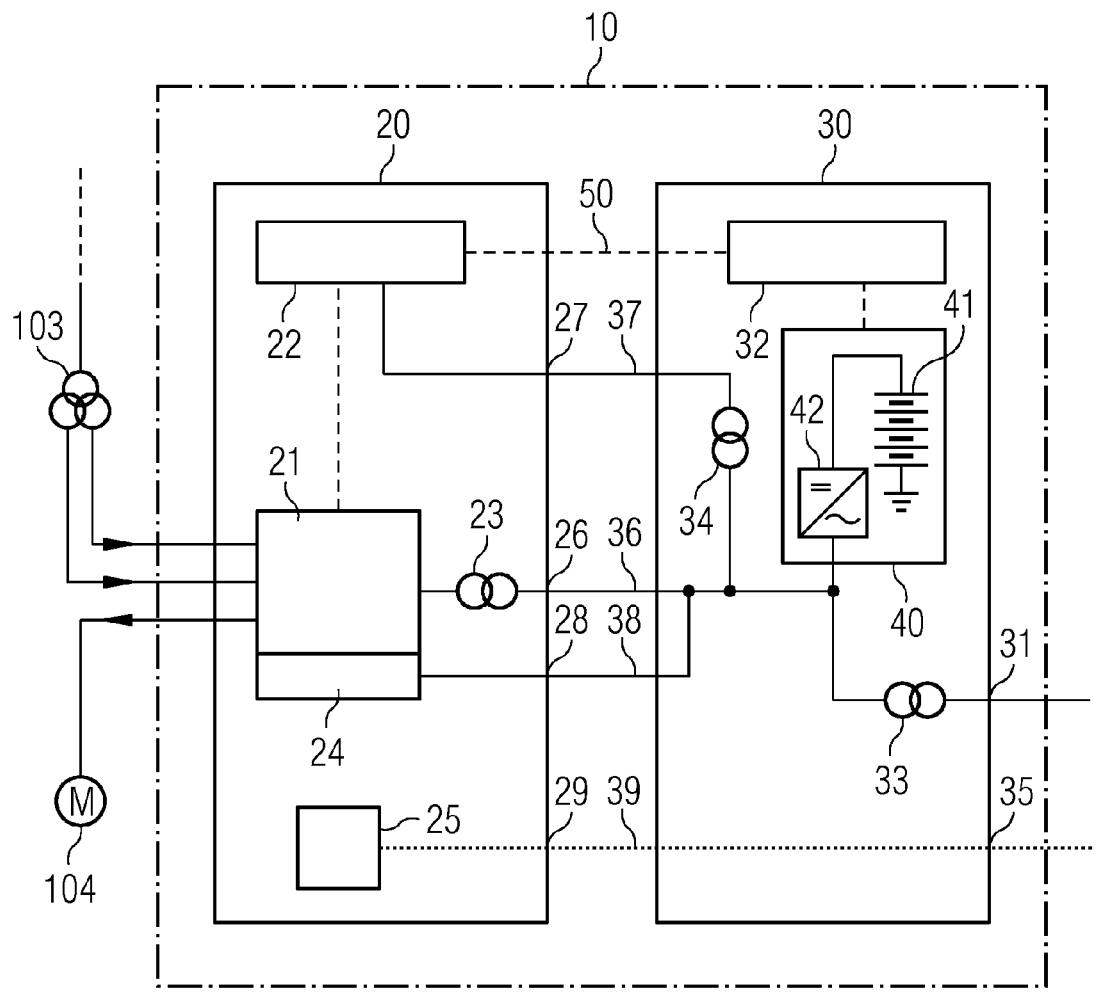
FIG. 6 is a schematic diagram showing a drive system and a hot standby power supply in accordance with an embodiment.
Figure 7:
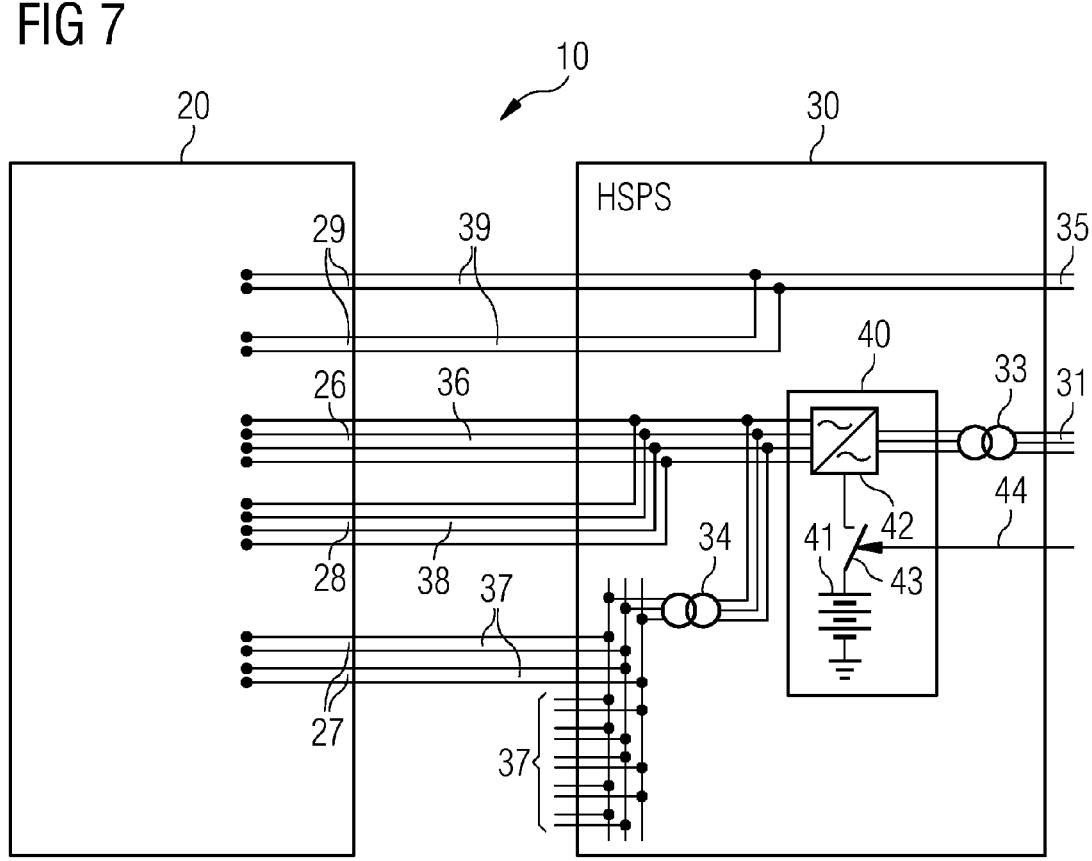
FIG. 7 is a schematic diagram showing a hot standby power supply in accordance with an embodiment.

FIG. 6 shows a variable frequency drive system 10 including a variable frequency drive 20 and a hot standby power supply 30 in accordance with an embodiment. As schematically illustrated, a main energy for operating the motor 104 is supplied to a converter 21 of the VFD 20 via the three winding transformer 103. The VFD 20 includes a plurality of other systems that require electric power for operation, including a VFD controller 22, a charging transformer 23, essential auxiliaries including a cooling unit 24, and non-essential auxiliaries 25. Power for these components is provided by the HSPS 30. HSPS 30 may thus also be termed VFD pre-charge and auxiliaries power supply. The HSPS 30 has a power input 31 that is, for example, connected to the low voltage distribution panel 106 of FIG. 1. An AC voltage between about 200 and about 1,000 V (e.g., 690 V AC) may be received via the power input 31 (e.g., receiving voltage level). An optional transformer 33 may be provided for transforming the received electric power to another voltage level (e.g., a lower voltage level such as 400 V). HSPS 30 further includes an electric power storage unit 40 that is in the example of FIG. 6 electrically connected to a secondary side of the transformer 33. Electric power storage unit 40 (e.g., storage unit) includes a DC electric power storage element 41 (e.g., a storage element) that may, for example, include a battery or a capacitor bank. Since AC electric power is received at input 31, a converter 42 is provided in the storage unit 40. Converter 42 may be controllable to be operable as a rectifier when charging the storage element 41 and as an inverter when discharging the storage element 41. In other configurations, converter 42 may include a rectifier stage, an intermediate DC link and an inverter stage. The storage element 41 is coupled to the intermediate DC link. One embodiment of this configuration is schematically illustrated in FIG. 7. The HSPS 30 may further include a bypass switch (e.g., manual and/or static) that may be adapted to bypass the power storage unit 40 in case of failure of the power storage unit 40 (bypass switch not shown).

Transformer 33 may, for example, provide electric power at a first voltage level. HSPS 30 includes a further transformer 34 (e.g., 'first transformer') that transforms the electric power to a second voltage level. HSPS 30 further has a first electric connection 36 towards a converter power input 26 (e.g., pre-charge input) of the VFD 20, and a second electric connection 37 to a controller power input 27 of the VFD 20. HSPS 30 provides electric power at the first voltage level via the first connection 36 and at the second voltage level via the second electric connection 37. A third electric connection 38 towards a cooling unit/auxiliaries power input 28 of the VFD 20 may also be provided. In other configurations, the third electric connection 38 may be omitted, and the power for the cooling unit/auxiliaries may be taken from the converter power input 26 within the VFD 20.

A further electric connection 39 may be provided, which supplies the VFD 20 with power for non-essential consumers 25, such as VFD space heaters or the like. For this purpose, the HSPS 30 may have an additional power input 35 that connects to respective low voltage distribution systems.

HSPS 30 further includes a HSPS controller 32, which, for example, controls the operation of the storage unit 40. A communication link 50, via which the HSPS controller 32 may communicate with a VFD controller 22, is provided. HSPS 30 may further include a communication link towards the power network (e.g., the main power supply), so that the HSPS 30 may receive information on the status of the main power supply and indications of commands/instructions issued within the power network.

The VFD 20 includes the converter 21, which for operating the motor 104, receives electric power via two phase shifted inputs from the three winding transformer 103 and outputs electric power at controllable AC frequency. The converter 21 is controlled by the VFD controller 22. For starting the operation of the VFD 20, the VFD 20 includes a charging transformer 23 via which the capacitance of the DC link of converter 21 may be pre-charged. The VFD 20 further includes a cooling unit and other essential auxiliaries 24, such as lubrication pumps or the like. The cooling unit includes a cooling pump for cooling components of the converter 21, such as power electronics or the like. When the VFD 20 is started and during normal operation, the HSPS 30 supplies electric power to the VFD 20 via the electric connections 36, 37 and 38 and the inputs 26, 27 and 28, respectively. Power may only be provided via first electric connection 36 and converter power input 26 during the startup phase of VFD 20 for pre-charging the DC link of converter 21.

Figure 8:
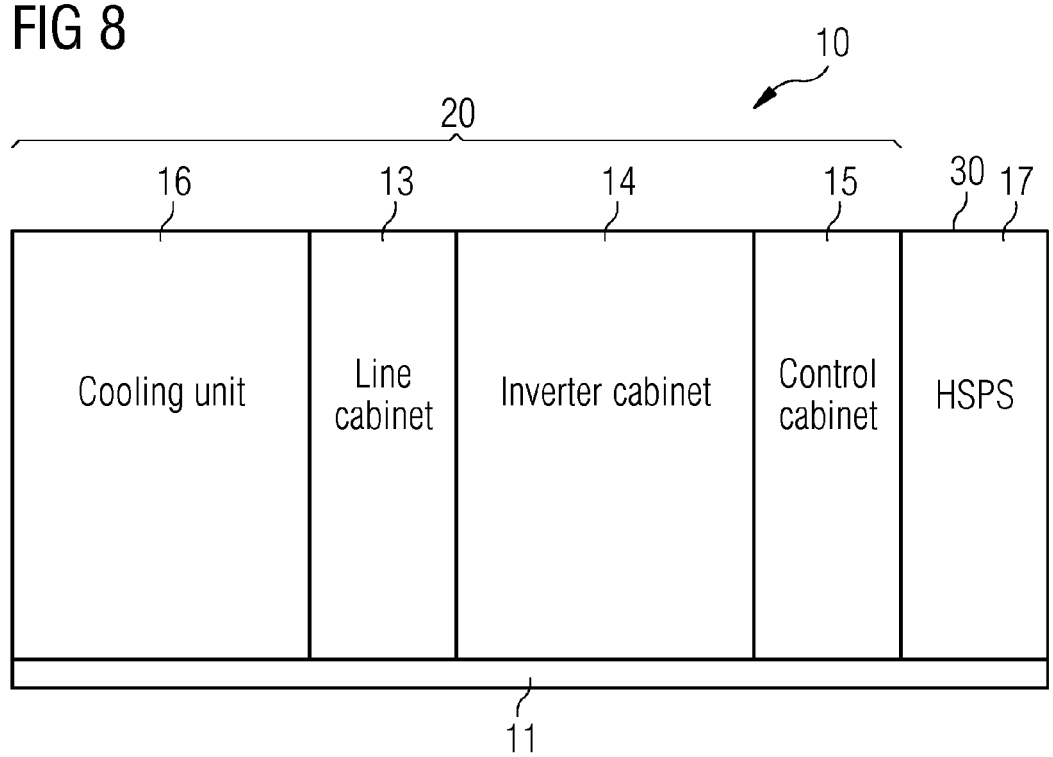
FIG. 8 is a schematic diagram showing a physical configuration of a drive system in accordance with an embodiment.

The VFD 20 and the HSPS 30 may be mounted on a common base frame 11, as illustrated in FIG. 8. VFD 20 may be included in one or more cabinets, and the HSPS 30 may be included in a separate cabinet mounted adjacent to the VFD cabinets. The electric connections and the communication link may thus be easily established with short connection distances. Pre-assembly may also be provided. Installation and hooking up of the drive system 10 is thus facilitated, since only the power input 31 is to be connected to the low voltage distribution 106. If provided, a low voltage connection via input 35 for the non-essential auxiliaries 25 may also be established.

HSPS controller 32 and VFD controller 22 are configured to maintain the VFD 20 in a standby mode after a blackout of the main power supply occurs. The occurrence of a blackout may be detected in a variety of ways, including the measurement of an input voltage by HSPS controller 32 or VFD controller 22, receiving a message by either one of the controllers from the power network of the vessel, or measuring the voltage on the DC link of converter 21. A respective indication may, for example, be provided by VFD controller 22 via communication link 50 to the HSPS controller 32. Upon detection of a blackout, HSPS controller 32 may control the storage unit 40, so that storage unit 40 supplies electric power by discharging the storage element 41. Depending on the configuration, electric power is provided via the first electric connection 36 and the charging transformer 23 to the DC link of converter 21. Similar to a pre-charge operation, the DC link may thus be kept above a predefined voltage level. Electric power is provided via the second electric connection 37 to the VFD controller 22 to enable the VFD 20 to "stay alive". Depending on the configuration of VFD 20, cooling unit 24 may be operated during standby and may thus also receive electric power from HSPS 30, or may be switched off.

Depending on the sizing of storage unit 40 (e.g., the capacity of storage element 41), the VFD 20 may be kept in a standby mode for a certain period of time. During the period of time, the voltage on the DC link of converter 21 is kept above the predetermined voltage level. As soon as the main power supply comes back online, VFD 20 may thus resume operation. The time required for continuing operation of motor 104 may thus be reduced significantly. Different possibilities of operating the HSPS 30 are described hereinafter with respect to FIGS. 9 to 11 in more detail.

The drive system 10 illustrated in FIG. 7 is configured similarly to the drive system 10 of FIG. 6. The explanations given above thus apply correspondingly to the drive system 10 of FIG. 7, unless noted otherwise.

In FIG. 7, the HSPS 30 takes care of the power supply to all internal auxiliaries of VFD 20. As an example, the VFD 20 may be connected to external circuits of the overall power grid including to a 690 V circuit, three-phase AC (e.g., other voltages such as 400, 440, 480 or the like may also be used), and to one general power circuit at 230 V, one phase, for space heating and other non-essential consumers. The supplies may all be insulated terra (IT) supplies. In case of a blackout, all of the general power supply circuits are to be considered as dead. The HSPS 30 replaces all these incomers to the VFD 20. The non-essential consumers, such as the space heaters and the like, remain directly energized from the overall power grid. The respective connections may only be terminated in terminal blocks at the HSPS (and then passed through as depicted).

In the example of FIG. 7, the storage unit 40 includes a converter 42 including a DC link towards which the storage element 41 is coupled. The storage unit 40 further includes a circuit breaker 43 that may be operated via an input 44. The HSPS may be configured to allow an emergency shut down of the energy storage element 41 and/or of the HSPS via the communication input 44. Although not illustrated in FIG. 7, the input 44 may be connected to the HSPS control unit 32, which is not shown in FIG. 7.

FIG. 7 further illustrates the different phases of each connection. Electric connections 39 provide power to the VFD space heaters and include one phase and neutral. The VFD space heaters may be fed by 230 V IT, or other applicable voltages. The electric connections 36 and 38 each include three phases and neutral, and may be provided by 400 V AC via transformer 33. Electric connection 36 may feed the VFD pre-charge, and may feed cooling fans, where the connection 38 may feed cooling unit pumps and other essential auxiliaries. As mentioned above, electric connection 38 may be omitted. The electric connections 37 include one phase and neutral, and one of the electric connections 37 may feed the VFD controller 22 (e.g., at 230 V IT), where the other of the electric connections 37 may feed a cooling unit controller (e.g., at 230 V IT). The HSPS may be equipped with additional feeding circuits 37, which may be connected to, for example, controllers of other components, such as of a VFD transformer (e.g., 103), a VFD motor (e.g., 104) or the like.

FIG. 7 shows a simplified illustration of the VFD and the HSPS, and the components shown in FIG. 6 may also be included in the VFD and HSPS of FIG. 7.

FIG. 8 shows the cabinets that include different components of the drive system 10. The cooling unit (e.g., cabinet 16) is optional and may not be provided in other embodiments. In other embodiments, the HSPS 30 may be a stand alone unit. Drive system 10 includes the line cabinet 13, the inverter cabinet 14, the control cabinet 15 (e.g., including the VFD controller 22) and the cooling cabinet 16 (e.g., including the cooling unit 24). All cabinets are mounted on a common frame 11, including the cabinet 17 of the HSPS 30. A different separation of the VFD 20 components into cabinets may be provided.

Figure 9:
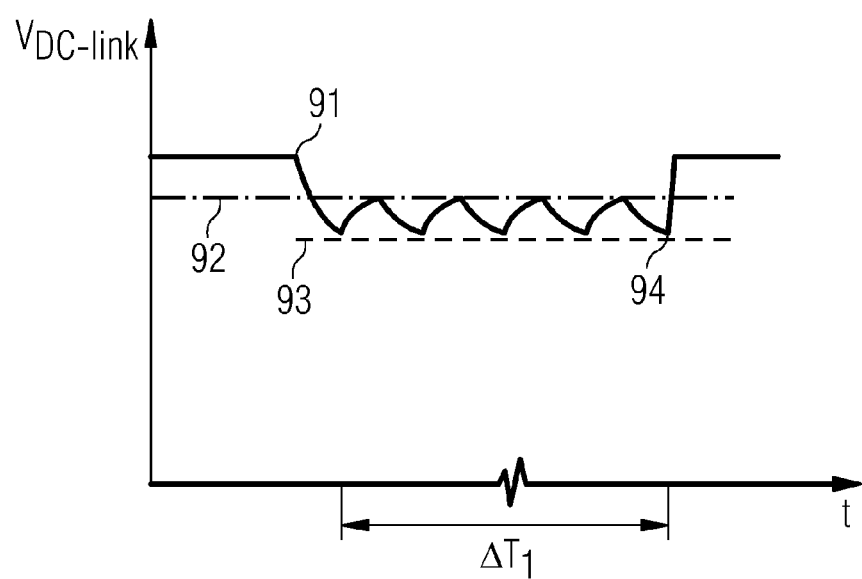
FIG. 9 is a diagram showing a voltage of a DC link of converter over time when power is supplied from a hot standby power supply in accordance with an embodiment.

FIG. 9 illustrates how the VFD 20 may remain available in case of an overall power grid blackout using the HSPS 30. At the point in time 91, the main power supply is interrupted. As shown, the DC link voltage drops. When reaching the lower voltage threshold 93, the HSPS supplies electric power to the converter power input of the VFD, thus bringing the DC link voltage back up to a pre-charge voltage level 92. The power supply is then again switched off, thereby repeating this cycle. At point in time 94, the main power supply is restored. Since the DC link voltage is maintained above the lower voltage level 93, which is above the trip level 205, the VFD 20 is maintained in "hot standby mode" and is ready for an immediate closing of the feeding circuit breaker and continuation of operation. Voltage on the DC link may be maintained above the lower voltage level 93 for a given a time $\Delta T_1$, which is dependent on the capacity of the storage unit 40. If the main power supply is restored within $\Delta T_1$, the DC link voltage returns to 100%, and operation continues. The electric motor coupled to the VFD is ready to supply torque immediately.

The functionality of the HSPS controller may in some embodiments be implemented in the VFD controller. The HSPS controller may, for example, not be arranged within the HSPS, but may be arranged within the VFD or may be part of the VFD controller.

The pre-charge voltage level 92 may be set such that the energy consumption of the VFD during hot standby is minimized, and $\Delta T_1$ is thus maximized. During $\Delta T_1$, the HSPS further supplies electric power to the VFD controller or to the essential auxiliaries.

An appropriate configuration of the VFD controller 22 may make sure that the VFD 20 does not produce any fault signal or run into any fault condition during $\Delta T_1$. FIG. 10 illustrates a situation in which the duration of the blackout is longer than $\Delta T_1$. The controller 32 of HSPS 30 is configured to stop supplying electric power to at least the converter power input of the VFD 20 if a predetermined condition is met (e.g., after the expiry of $\Delta T_1$) or after the storage element 41 is discharged to a certain level. This way, it may be provided that a certain amount of electric energy is retained in the storage element 41 for pre-charging the VFD 20 in parallel to the recovery of the main power supply.

After stopping the supply of electric power to the converter power input at 95, the voltage on the DC link may drop to zero, as illustrated in FIG. 10. The fault in the main power supply is cleared during a time period $\Delta T_2$. Upon receiving an indication that the main power supply will come back online, the HSPS 30 starts the pre-charging of the VFD 20 at point in time 96. This indication may, for example, be a start signal that is given to the main power generators of the power system 100. The power system 100 may be configured so that the same signal or command that is given to the main power generators is also given to the drive system 10 (e.g., to the VFD 20 or the HSPS 30, in particular to respective controllers via respective communication links). Using the electric energy retained in the storage element 41, the HSPS starts to pre-charge the converter 21 of VFD 20, so that the voltage on the DC link of the converter 21 rises back towards the pre-charge voltage level 92 during the time period $\Delta T_3$. At point in time 94, the main power supply comes back online. Accordingly, the DC link voltage returns to 100%, and the VFD may continue operation. Thus, the feeder circuit breaker of the VFD 20 may be closed immediately after the restoring of the main power supply, and the time during which the VFD 20 is not available may be reduced. Pre-charging the frequency converter in parallel to the re-energization of the power grid of the vessel thus significantly reduces the start up time.

Regarding the capacity of the storage unit 40, the capacity may be chosen such that for most situations, a $\Delta T_1$ that is longer than the blackout of the main power supply in most circumstances may be achieved. The backup energy necessary for pre-charging the VFD during the time period $\Delta T_3$ may be considered when determining the capacity. During $\Delta T_2$, control power may continuously be supplied to the controller of the VFD, and also to the HSPS controller. The electric energy required for providing power to these components may also be considered when determining the capacity of the storage element.

The system 10 may be configured so that the power consumption requirements for cooling pumps and other auxiliaries may be kept to a minimum. This way it may be provided that the capacity of the storage unit 40 and thus the size of the HSPS unit may be kept small. As an example, hot standby during $\Delta T_1$ may be achieved without running the cooling pumps. The respective components (e.g., IGBT power transistors) may be kept in standby without water cooling. Another option is the replacement of components by alternative components, which do not require active cooling. The HSPS size may thus be reduced significantly.

FIG. 11 shows a flow diagram in accordance with an embodiment of. The method may be performed by any of the above outlined embodiments of the drive system 10, the VFD 20 and the HSPS 30. In act S1, the VFD is operated in normal operating conditions from the main power supply. A blackout of the main power supply occurs in act S2. As previously illustrated in FIG. 4, kinetic buffering is used in act S3 to maintain the voltage on the DC link above trip level. If the main power supply is restored during the kinetic buffering act S3, the method continues with act S9, as indicated by the dotted arrow.

After the kinetic energy has been used up, the method continues with act S4, in which electric power is supplied from the power storage unit of the HSPS to the VFD converter power input, the VFD controller power input and possibly to a cooling unit/cooling unit controller of the VFD (e.g., via the electric connections 36-38). This may be done so as to maintain DC link voltage above a lower voltage threshold while maximizing $\Delta T_1$, as illustrated in and explained with respect to FIG. 9. This is continued until a threshold value for the electric power stored in the storage unit 40 is reached (decision act S5). If the threshold is reached, the HSPS stops supplying electric power to the VFD (e.g., act S6; see also FIG. 10; stops supplying to the converter power input of the VFD). The VFD controller may continuously be supplied with electric power by the HSPS. After receiving a generator or VFD start command in act S7 indicating that the main power supply is coming back online, the HSPS supplies power from the power storage unit to the VFD controller power input to pre-charge the DC link of the VFD converter (act S8). Electric power may be supplied to the cooling unit or other essential auxiliaries of the VFD in act S8. The VFD is thus brought back into the hot standby condition. In act S9, the main power supply is restored, and full operation of the VFD is resumed. Again, if during the act S4 the main power supply is restored, the method continues with act S9, as indicated by the dotted arrow.

As shown from the above, embodiments provide a rapid restart and a hot standby for the VFD 20, thereby maintaining the availability of the VFD in case of a blackout of the main power supply. The HSPS may use only one point of connection for the essential auxiliary and control power cables, and is thus easy to install. The need for a separate UPS for supplying associated UPS consumers may be eliminated, since the HSPS may also supply control voltage to other consumers. For example, when used in a thruster drive application of a dynamically positioned vessel operating in an Equipment class 3 (DP3) mode with a closed ring configuration of the main HV distribution system, embodiments may increase the availability of the system. Also, change over switches and control systems for such switches, which may be used with external UPS systems, may be avoided. Even for longer lasting blackouts, for which the VFD may not be maintained in hot standby over the whole duration, recovery time of the system is shortened by enabling a parallel pre-charging of the VFD.

While specific embodiments are disclosed herein, various changes and modifications may be made without departing from the scope of the invention. The present embodiments are to be considered in all respects as illustrative and non-restrictive, and all changes coming within the meaning and equivalency range of the appended claims are intended to be embraced therein.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A hot standby power supply for a variable frequency drive of a floating vessel, the variable frequency drive powering an electric motor of the floating vessel, the hot standby power supply comprising:
   a power input operable for receiving electric power from a main power supply of the floating vessel;
   a first electric connection configured to supply electric power at a first voltage level to a converter power input of the variable frequency drive;
   a second electric connection configured to supply electric power at a second voltage level to a control power input of the variable frequency drive, wherein the first voltage level is higher than the second voltage level;
   a transformer operable for transforming received electric power to the first voltage level or to the second voltage level;
   an electric power storage unit operable for storing and supplying electric power, the electric power storage unit being electrically connected so as to be operable to supply electric power to both the first electric connection and the second electric connection, the first electric connection or the second electric connection being supplied via the transformer for providing the first voltage level or the second voltage level, respectively; and
   a control unit configured to control the hot standby power supply such that in operation, electric power received at the power input is provided to the converter power input and to the control power input of the variable frequency drive via the first electric connection and the second electric connection, and that upon an interruption in the supply with electric power from the main power supply, electric power is supplied from the electric power storage unit to the converter power input and to the control power input of the variable frequency drive via the first electric connection and the second electric connection,
   wherein the control unit is further configured to:
      terminate the provision of electric power from the electric power storage unit to at least the converter power input of the variable frequency drive after a first amount of time or after a predetermined condition is met; and
      restart the provision of electric power from the electric power storage unit to the converter power input of the variable frequency drive upon receiving an indication that the supply with electric power from the main power supply will resume.

2. The hot standby power supply of claim 1, wherein the transformer is a step down transformer configured to provide a voltage conversion from the first voltage level to the second voltage level.

3. The hot standby power supply of claim 1, wherein the transformer is a first transformer, and
   wherein the hot standby power supply further comprises a second transformer connected to the power input of the hot standby power supply and configured to convert received electric power from a receiving voltage level to the first voltage level or the second voltage level, the electric power storage unit being electrically coupled to a secondary side of the second transformer.

4. The hot standby power supply of claim 1, further comprising a third electric connection to an auxiliaries power input of the variable frequency drive, the auxiliaries power input being electrically coupled to one or more auxiliaries of the variable frequency drive including at least a cooling unit, the hot standby power supply being configured to supply electric power at the first voltage level or the second voltage level to the auxiliaries power input so as to provide electric power to the cooling unit.

5. The hot standby power supply of claim 1, wherein the received electric power is AC electric power, the electric power storage unit comprising a DC electric power storage element and a converter, the converter being configured to convert received AC electric power to DC electric power when charging the storage element and to convert DC electric power supplied by the storage element to AC electric power when the electric power storage unit supplies electric power to the first electric connection and the second electric connection.

6. The hot standby power supply of claim 5, wherein the DC electric power storage element comprises a battery, a capacitor bank, or the battery and the capacitor bank.

7. The hot standby power supply of claim 1, further comprising a communication link towards a controller of the variable frequency drive configured to enable a communication between the control unit of the hot standby power supply and the controller of the variable frequency drive.

8. The hot standby power supply of claim 1, wherein the control unit is configured to restart supplying electric power from the power storage unit to the converter power input of the variable frequency drive upon receiving an indication on a start signal being supplied to a generator of the main power supply.

9. A drive system comprising:
   a variable frequency drive for powering an electric motor of a floating vessel, the variable frequency drive comprising:
      a converter having a DC link;
      a controller configured for controlling the variable frequency drive;
      a converter power input configured for supplying electric power to the converter to precharge the DC link; and
      a controller power input configured for supplying electric power to the controller of the variable frequency drive; and
   a hot standby power supply for the variable frequency drive, the hot standby power supply comprising:
      a power input operable for receiving electric power from a main power supply of the floating vessel;
      a first electric connection configured to supply electric power at a first voltage level to a converter power input of the variable frequency drive;
      a second electric connection configured to supply electric power at a second voltage level to a control power input of the variable frequency drive, wherein the first voltage level is higher than the second voltage level;
      a transformer operable for transforming received electric power to the first voltage level or to the second voltage level;
      an electric power storage unit operable for storing and supplying electric power, the electric power storage unit being electrically connected so as to be operable to supply electric power to both the first electric connection and the second electric connection, the first electric connection or the second electric connection being supplied via the transformer for providing the first voltage level or the second voltage level, respectively; and
      a control unit configured to control the hot standby power supply such that in operation, electric power received at the power input is provided to the converter power input and to the control power input of the variable frequency drive via the first electric connection and the second electric connection, and that upon an interruption in the supply with electric power from the main power supply, electric power is supplied from the electric power storage unit to the converter power input and to the control power input of the variable frequency drive via the first electric connection and the second electric connection, wherein the first electric connection is electrically connected to the converter power input, and the second electric connection is electrically connected to the controller power input, and wherein the control unit is further configured to:
terminate the provision of electric power from the electric power storage unit to at least the converter power input of the variable frequency drive after a first amount of time or after a predetermined condition is met; and
restart the provision of electric power from the power storage unit to the converter power input of the variable frequency drive upon receiving an indication that the supply with electric power from the main power supply will resume.

10. The drive system of claim 9, wherein the electric motor is an electric motor of a thruster of the floating vessel.

11. The drive system of claim 9, wherein the drive system is a drive system of a dynamically positioned vessel, and the variable frequency drive is configured to supply electric power to an electric motor of a thruster of the dynamically positioned vessel.

12. The drive system of claim 9, wherein the variable frequency drive comprises a charging transformer connected between the converter power input and the converter.

13. The drive system of claim 9, wherein the variable frequency drive comprises a cooling unit, and the drive system comprises an electric connection between the hot standby power supply and the variable frequency drive enabling the supply of electric power from the electric power storage unit to the cooling unit.

14. The drive system of claim 9, further comprising:
a variable frequency drive cabinet, the variable frequency drive being mounted in the variable frequency drive cabinet; and
a hot standby power supply cabinet, the hot standby power supply being mounted in the hot standby power supply cabinet, the hot standby power supply cabinet being mounted on a common base frame with the variable frequency drive cabinet.

15. A method for operating a hot standby power supply for supplying electric power to a variable frequency drive, the method comprising:
receiving electric power at a power input of the hot standby power supply from a main power supply;
providing electric power at a first voltage level to a converter power input of the variable frequency drive via a first electric connection;
providing electric power at a second voltage level to a controller power input of the variable frequency drive via a second electric connection, wherein the first voltage level is higher than the second voltage level;
transforming, with a transformer, received electric power to the first voltage level or to the second voltage level;
providing received electric power to a power storage unit for charging the power storage unit;
detecting an interruption in the supply with electric power by the main power supply;
supplying electric power from the power storage unit to the converter power input and to the controller power input of the variable frequency drive via the first electric connection and the second electric connection, the first electric connection and the second electric connection being supplied with the electric power via the transformer for providing the respective first voltage level or second voltage level;
terminating the supply of the electric power from the power storage unit to at least the converter power input of the variable frequency drive after a first amount of time or after a predetermined condition is met; and
restarting the supply of the electric power from the power storage unit to the converter power input of the variable frequency drive upon receiving an indication that the supply with electric power from the main power supply will resume.

16. The hot standby power supply of claim 1, wherein the predetermined condition comprises expiration of a time period or the electric power storage unit being discharged to a particular level.

* * * * *